(12) United States Patent
Takaoka

(10) Patent No.: US 6,710,896 B1
(45) Date of Patent: Mar. 23, 2004

(54) IMAGE PROCESSING APPARATUS

(75) Inventor: Naoki Takaoka, Kanagawa (JP)

(73) Assignee: Fuji Photo Film Co., LTD, Kanagawa (JP)

( * ) Notice: Subject to any disclaimer, the term of this patent is extended or adjusted under 35 U.S.C. 154(b) by 0 days.

(21) Appl. No.: 09/426,726

(22) Filed: Oct. 26, 1999

(30) Foreign Application Priority Data

Oct. 26, 1998 (JP) .......................................... 10-303954

(51) Int. Cl.$^7$ .............................................. G06K 15/00
(52) U.S. Cl. ......................... 358/1.9; 358/2.1; 358/3.1
(58) Field of Search ................................ 358/474, 498, 358/2.1, 1.9, 1.15, 299, 3.1, 1.6

(56) References Cited

U.S. PATENT DOCUMENTS 5,768,412 A * 6/1998 Mitsuyama .................. 382/173

FOREIGN PATENT DOCUMENTS

| JP | 57-188199 | * | 10/1982 | ............ H04N/1/40 |
| JP | 401297265 | * | 11/1989 | ............ B41J/3/20 |
| JP | 402199586 | * | 8/1990 | ........... G06F/15/68 |
| JP | 406282016 A | * | 10/1994 | ........... G03B/27/70 |

* cited by examiner

*Primary Examiner*—Jerome Grant, II
(74) *Attorney, Agent, or Firm*—Birch, Stewart, Kolasch & Birch, LLP

(57) ABSTRACT

There is provided an image processing apparatus comprising an uneven density characteristics acquiring device in which uneven density characteristics associated with at least one of a camera model used to take an image of a photographic film and taking data are acquired, and an image data correcting device for correcting an input image data in accordance with the thus acquired uneven density characteristics. Even images taken on a film with lens or using a compact camera can be corrected not only for the reduction of the marginal luminosity associated with the lens performance itself but also for the uneven marginal luminosity associated with shutter type and shutter speed, and for the variation in the reduction of the marginal luminosity associated with stop-down value, thereby enabling consistent production of natural finished high-quality images that are by no means dark at the edges.

17 Claims, 10 Drawing Sheets

IMAGE PROCESSING APPARATUS

BACKGROUND OF THE INVENTION

This invention relates to an image processing apparatus that reads film images photoelectrically and which performs specified image processing schemes on the obtained image data to produce image data for output. More particularly, the invention relates to an image processing apparatus that has a capability for correcting uneven densities that occur in a frame of the image taken on a film with lens or using a compact camera or another inexpensive and low-performance camera, that is, shutter unevenness due to the shutter speed when shooting, reduction or deterioration of the image marginal luminosity (brightness at the edges of image field) due to the taking lens, and variation in the reduction of the marginal luminosity due to the stop-down value.

Heretofore, the images recorded on photographic films such as negatives and reversals (which are hereunder referred to simply as "films") have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing schemes to produce image data for recording purposes; recording light modulated in accordance with the image data is used to scan and expose a light-sensitive material to record a latent image, which is subsequently m developed to produce a finished print. The printer operating on this principle has been commercialized as a digital photoprinter.

In the digital photoprinter, images can be processed as digital image data to determine exposure conditions for printing, so various operations including the correction of washed-out highlights and flat (dull) shadows due to the taking of pictures with rear light or an electronic flash, sharpening, and the correction of color or density failure can be performed in an effective manner to produce prints of the high quality that has been unattainable by the conventional direct exposure. In addition, the assembling of images and the splitting of a single image into plural images, as well as the composition of characters can be performed by processing the image data and, as a result, prints can be output after various editing and/or processing operations have been performed in accordance with specific uses. Outputting images as prints (photographs) is not the sole capability of the digital photoprinter; the image data can be supplied into a computer or the like and stored in recording media such as a floppy disk; hence, the image data can be put to various non-photographic uses.

Having these features, the digital photoprinter is basically composed of the following units: an image input unit comprising a scanner (image reading apparatus) that reads the image on a film photoelectrically and an image processing apparatus that processes the captured image to produce image data for output (exposure conditions); and an image output unit comprising a printer (image recording apparatus) that records a latent image on a light-sensitive material by scan exposing it in accordance with the image data output from the image input unit and a processor (developing apparatus) that performs development and other necessary processing oh the exposed light-sensitive material to produce a print.

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as data for the image on the film (as image data signals) after being optionally subjected to various image processing schemes.

In the image processing apparatus, image processing conditions are set on the basis of the image data captured with the scanner and image processing as determined by the thus set conditions is performed on the captured image data and the resulting output image data for image recording (i.e., exposing conditions) are sent to the printer.

In the printer, if it is of a type that relies upon exposure by scanning with an optical beam, the latter is modulated in accordance with the image data from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. In the processor, development and other processing, as determined by the light-sensitive material are performed in the processor to produce a print (photograph) reproducing the image that was recorded on the film.

In order to obtain high-quality prints, the image of a scene that was taken (i.e., the information about the image) is preferably recorded on a film as much as possible and in a faithful way. In fact, however, if the performance of the taking lens is not very high, it often occurs that the marginal luminosity is deteriorated as compared with the center of the image to thereby cause density unevenness in the image. This problem commonly referred to as "reduction of the marginal luminosity" is particularly noticeable in a "film with lens", or an integral photographic film and lens combination, since the rigorous cost restraints make it uneconomical to use a lens of very high performance. Further, the compact cameras have also the inevitable reduction of the marginal luminosity, because the lens performance is restricted by the cost restraints. As a result, the finished print has an image with dark edges, and the density unevenness is found in the image, leading to the deterioration in the image quality. There are three types of density unevenness, the first type is the reduction of the marginal luminosity due to the lens performance itself, the second type is the density unevenness associated with camera model (i.e., shutter type) and shutter speed, and the third type is the lens-dependent variation in the reduction of the marginal luminosity associated with stop-down value. Exemplary shutter types used in camera models include a pendulum-type shutter in the film with lens, a lens shutter in the compact camera, and a focal-plane shutter in the single-lens reflex camera.

Of these three types of density unevenness, there have been conventionally proposed, for the first type due to the lens performance itself, a number of methods for correcting deterioration in image quality. However, no effective method has heretofore been known to correct the density unevenness associated with camera model, shutter type and shutter speed as well as the variation in the reduction of the marginal luminosity associated with stop-down value.

SUMMARY OF THE INVENTION

The present invention has been accomplished under these circumstances and has as an object providing an image processing apparatus with which not only the heretofore correctable reduction of the marginal luminosity that is associated with lens performance itself but also the image density unevenness that is associated with shutter type and shutter speed, as well as variation in the reduction of the image marginal luminosity that is associated with stop-down value can be corrected to ensure consistent production of high-quality images that have no density unevenness nor darkness at the edges.

In order to achieve the above object, the inventor has made intensive investigations on the deterioration in the image quality of finished prints, and finally found that the method of correcting deterioration in image quality proposed by the inventor in U.S. Ser. No. 09/276,464 under the title "image processing apparatus" is significantly effective for correcting the reduction of the marginal luminosity associated with taking lens performance itself, but that the proposed image processing apparatus cannot remove other types of image density unevenness in the frame that is caused by the shutter type and shutter speed, namely shutter unevenness and lens-dependent variation in the reduction of the marginal luminosity associated with stop-down value. The inventor has also found that these types of density unevenness are caused as follows:

FIG. 10 illustrates the operating principle of the simplest pendulum-type shutter, and FIGS. 11a and 11b show how the amount of exposure varies on the film image as the shutter moves. In FIG. 10, numeral 1 designates an optical path (lens), 2a refers to the shutter closing the optical path, and 2b refers to the shutter in a position clear of the optical path. Briefly, the shutter reciprocates between two states 2a and 2b so that the image on the film is subjected to a specified amount of exposure through the optical path 1. FIG. 11a shows four areas into which the film image is split, and FIG. 11b shows how the amount of exposure varies from one area to another at different shutter speeds (shadowed bars representing the lower-speed shutter). As is clear from FIGS. 10, 11a and 11b, the pendulum-type shutter causes uneven exposure of the film image, which leads to unevenness in the density of the image.

The same phenomenon occurs depending on the value to which the camera was stopped down during shooting. As FIG. 12 shows, if a high stop-down value is used (indicated by the dashed line and corresponding to the use of only the central area of the lens), greater reduction occurs in the marginal luminosity, again leading to unevenness in the density of the image.

The density unevenness that is associated with shutter speed or stop-down value is only about a fraction to a tenth of the density unevenness due to lens performance itself; however, in order to ensure consistent production of high-quality images, the former must also be corrected in an appropriate manner. The inventor has found that the former can be corrected according to the present invention in the same manner as the correction of the reduced marginal luminosity performed in the image processing apparatus proposed by the inventor in U.S. Ser. No. 09/276,464.

The present invention provides an image processing apparatus that captures an image on a photographic film photoelectrically to produce input image data and which performs specified image processing schemes on the input image data to produce output image data, said apparatus comprising:

an uneven density characteristics acquiring device in which uneven density characteristics associated with at least one of a camera model used to take the image of said photographic film and taking data are acquired; and an image data correcting device for correcting said input image data in accordance with the thus acquired uneven density characteristics.

Preferably, said taking data include at least one of a shutter speed and a stop-down value in said camera model, and said uneven density characteristics are uneven density data in said image.

Preferably, said uneven density characteristics acquiring device previously includes:

a first storage device for storing said uneven density characteristics for each camera model used to take the image of said photographic film, or for each combination of the camera model with the taking data thereof, and a device for acquiring information about said camera model used to take the image of said photographic film or information about said camera model and the taking data thereof, and said uneven density characteristics associated with said camera model or said camera model together with said taking data are read out of said first storage device, based on the information acquired about said camera model or said camera model and said taking data.

Preferably, said first storage device stores reference uneven density characteristics in a reference shutter speed for said each camera model, and said uneven density characteristics acquiring device further includes a device for calculating uneven density characteristics associated with the shutter speed from said reference uneven density characteristics when said shutter speed in said camera model is different from said reference shutter speed.

Preferably, said reference uneven density characteristics are reference uneven density data that are corrected for each image reading apparatus for reading the image of said photographic film.

Preferably, said image data correcting device includes:

a first device for developing said uneven density characteristics acquired by said uneven density characteristics acquiring device into a first light attenuation amount in accordance with a position of said image, and a first density unevenness correcting device that subjects said input image data to a density unevenness correction of said image using said first light attenuation amount.

Preferably, said first device for developing said uneven density characteristics into said first light attenuation amount calculates the light attenuation amount in accordance with a distance from a center of said image due to said uneven density characteristics.

Preferably, said first density unevenness correcting device performs the density unevenness correction in said image using a distance from a center of said image and said first light attenuation amount.

Preferably, said image data correcting device changes a correction intensity of said density unevenness correction in accordance with a density of the photographic film of said image, decreases the correction intensity in a vicinity of a minimum density in the photographic film (e.g., a base density implying an unexposed area on a negative film, and a density defined as the fog area in a reversal film) or a maximum density in the photographic film(e.g., a density defined as the fog area in a negative film, and a base density implying an unexposed area in a reversal film), and increases the correction intensity as it gets farther away from the minimum density or the maximum density.

The image processing apparatus of the present invention further includes:

a device for acquiring information about said photographic film, and a device for mutually converting a density of the photographic film and a taking light quantity using characteristics of the photographic film as obtained from the information about said photographic film, and is characterized in that said image data correcting device performs said density unevenness correction in a region having said taking light quantity.

Preferably, in prescan mode for reading said image at low resolution performed prior to image reading for producing said output image data, said image data correcting device performs said density unevenness correction before image analyzing processing including an auto setup process is performed, or after only a color balance adjustment included in said image analyzing processing is performed.

Preferably, said image data correcting device does not perform intensely said density unevenness correction in a vicinity of a minimum density or a maximum density about said image, intensely performs said density unevenness correction in a density region apart from the minimum density or the maximum density, and performs said density unevenness correction with an intermediate intensity in an intermediate density region.

The image processing apparatus of the present invention further includes:

a taking lens characteristics acquiring device for acquiring taking lens characteristics of the camera model used to take the image of said photographic film, and is characterized in that said image data correcting device further includes:

a second device for developing said taking lens characteristics acquired by said taking lens characteristics acquiring device into a second light attenuation amount in accordance with a position of said image, and a second density unevenness correcting device that corrects density unevenness caused in a frame of said image due to reduction of marginal luminosity.

Preferably, said second device for developing said taking lens characteristics into the second light attenuation amount calculates the light attenuation amount in accordance with a distance from a center of said image due to said uneven density characteristics.

Preferably, said taking lens characteristics acquiring device includes:

a taking lens information acquiring device, and a second storage device for storing said taking lens characteristics for each of information about a taking lens previously prepared, and said taking lens characteristics in accordance with the information about the taking lens obtained by said taking lens information acquiring device are read out of said second storage device.

Preferably, said first and second storage devices are composed of one memory, said first and second density unevenness correcting device are composed of one unit, and said first and second light attenuation amounts are added and used to subject said input image data to the density unevenness correction in said image.

DETAILED DESCRIPTION OF THE INVENTION

The image processing apparatus of the invention is now described in detail with reference to the preferred embodiments shown in accompanying drawings.

Figure 1:
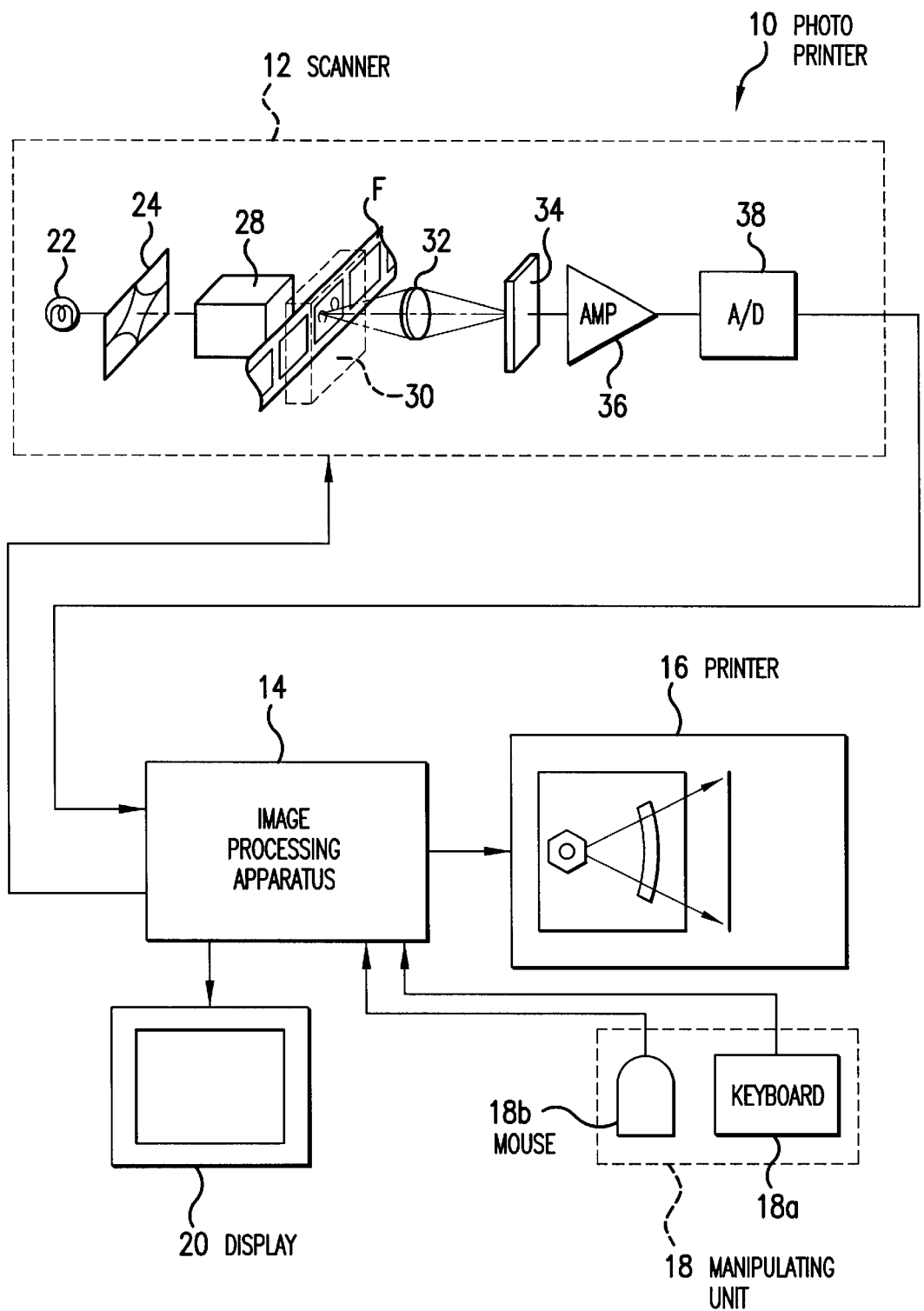
FIG. 1 is a block diagram showing an exemplary photoprinter utilizing the image processing apparatus of the invention.

FIG. 1 is a block diagram showing an exemplary digital photoprinter including an embodiment of the image processing apparatus of the invention.

The digital photoprinter 10 shown in FIG. 1 (which is hereunder referred to simply as "photoprinter") comprises basically an image reading apparatus (hereunder "scanner") 12 for photoelectrically reading the image recorded on a photographic film (hereunder referred to simply as "film") F, an image processing apparatus 14 which performs image processing on the thus read image data (image information) and with which the photoprinter 10 as a whole is manipulated and controlled, and a printer 16 which performs imagewise exposure of a light-sensitive material (photographic paper) with light beams modulated in accordance with the image data delivered from the image processing apparatus 14 and which performs development and other necessary processing to produce a (finished) print. In the following description, a negative film is used as a typical example of the photographic film F. However, this is not the sole case of the invention, and a positive film such as a reversal film may of course be used in place of the negative film.

Connected to the image processing apparatus 14 are a manipulating unit 18 having a keyboard 18a and a mouse 18b for inputting (setting) various conditions, selecting and commanding a specific processing step and entering a command and so forth for effecting color/density correction, as well as a display 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 28 which diffuses the reading light incident on the film F so that it becomes uniform across the plane of the film F, an imaging lens unit 32, an image sensor 34 having line CCD sensors capable of reading R (red), G (green) and B (blue) images, an amplifier (Amp) 36 and an A/D (analog/digital) converter 38.

In the photoprinter 10, dedicated carriers 30 are available that can be loaded into the body of the scanner 12 in accordance with the type or the size of the film used (e.g. whether it is a film of the Advanced Photo System (APS) or a negative or reversal film of 135 size), the format of the film (e.g. whether it is a strip or a slide) or other factor. By interchanging carriers, the photoprinter 10 can be adapted to process various kinds of films in various modes. The images (frames) that are recorded on the film and which are subjected to the necessary procedure for print production are transported to and held in a specified reading position by means of the carriers 30.

The scanner 12 captures the images recorded on the film F in the following manner; the reading light from the light source 22 has its quantity adjusted by means of the variable diaphragm 24 and is incident on the film F held in the specified reading position by means of the carrier 30 and thereafter passes through the film F to produce projected light bearing the image recorded on the film F.

Figure 2:
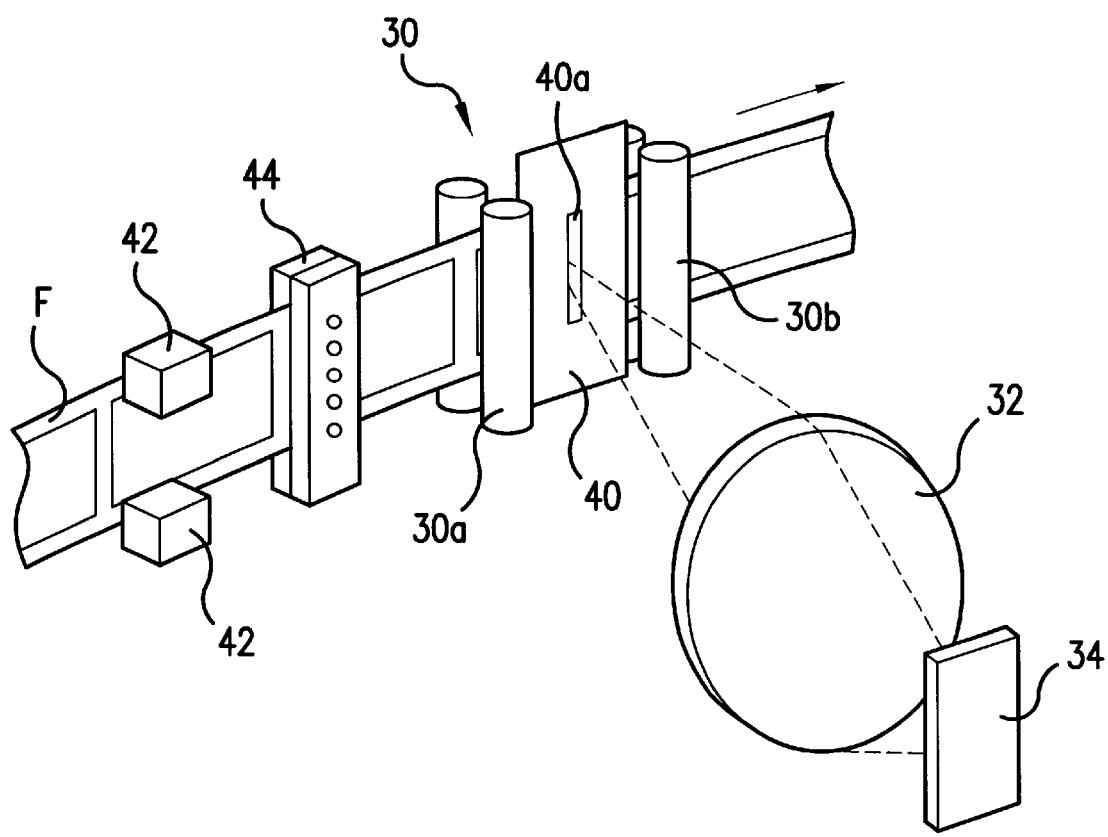
FIG. 2 is a schematic perspective view for illustrating the carrier to be installed in the photoprinter shown in FIG. 1.

The carrier 30 is adapted to handle films F of APS (or their cartridge). As shown schematically in FIG. 2, the carrier 30 has two transport roller pairs 30a and 30b and a mask 40 having a slit 40a. The transport roller pairs 30a and 30b set the film F in the specified reading position and are provided on opposite sides of the specified reading position in an auxiliary scanning direction (as indicated by the arrow) which is perpendicular to the main scanning direction (i.e., the direction in which the line CCD sensors in the image sensor 34 (see FIG. 3) extend) and they transport the film F with its length being parallel to the auxiliary scanning direction as it is in registry with the reading position. The slit 40a defines the projected light from the film F to have a specified narrow shape, is in registry with the reading position and extends in the main scanning direction.

Being held in registry with the reading position, the film F is transported in the auxiliary scanning direction by means of the carrier 30 as it is illuminated with the reading light. Consequently, the film F is subjected to two-dimensional slit scan with the reading light passing through the slit 40a extending in the main scanning direction, whereupon the image of each frame recorded on the film F is captured.

As is well known, magnetic recording media are preliminarily formed on an APS film to record various kinds of information. In addition, a magnetic information recording and reading device that is provided on a camera, a developing machine and the carrier 30 writes various kinds of information to the magnetic recording media or reads them from the media as required.

Figure 4:
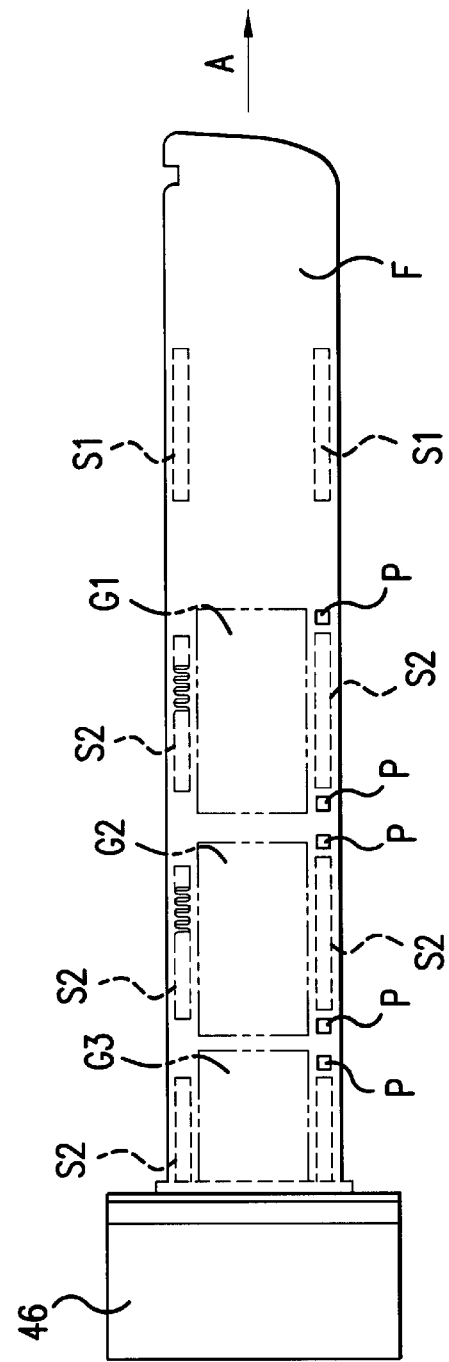
FIG. 4 shows schematically a film of an Advanced Photo System (APS)

As FIG. 4 shows in conceptual form, an APS film F has clear magnetic recording media S (S1 and S2) formed in the following regions along its length (in the auxiliary scanning direction): a specified region downstream of the leading frame G1 in the direction in which the film F is unwound from the cartridge (in the direction of arrow A), regions corresponding to respective frames G and a specified region upstream of the trailing frame (not shown), particularly near both edges of the film width (in the main scanning direction).

Information about the film F taken as a whole such as cartridge ID, film type, sensitivity and the date of development are magnetically recorded in the magnetic recording media S1 near the leading (or trailing) end of the film F, and information about each frame such as the date of taking the picture, taking data when taking the picture including shutter speed and stop-down value, the presence or absence of light emission from an electronic flash when taking the picture and the title are recorded in the magnetic recording media S2 in the individual frame regions. In principle, camera-related information including the information about the camera model, shutter type and taking lens is recorded on one side of the width of the magnetic recording media S whereas lab-related information is recorded on the other side.

Indicated by 46 in FIG. 4 is a cartridge housing for containing the film F and indicated by P are perforations for assisting in the transport (feeding and rewinding) of the film F.

The carrier 30 adapted to handle the APS film F also has two magnetic heads 42 which, in association with the two magnetic recording media S, read the information recorded on said media and record the necessary information.

Provided between the row of magnetic heads 42 and the mask 40 is a code reader 44 for optically reading bar codes such as DX code, expanded DX code and FNS code that are optically recorded on the film. Devices for reading such bar codes recorded on films are provided not only in the carrier 30 for APS but also in any conventional (film) carriers.

Various kinds of information that are captured with the magnetic heads 42 and the code reader 44 (for acquiring the information about the taking data when taking the picture including shutter speed and stop-down value, camera model, shutter type, taking lens and the film) are sent as required to the image processing apparatus 14 and other specified sites.

Figure 3:
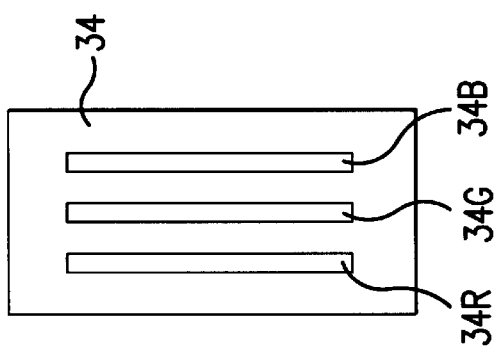
FIG. 3 shows in conceptual form the image sensor in the photoprinter shown in FIG. 1.

As already mentioned, the reading light passes through the film F held on the carrier 30 and the resulting image D1 bearing, projected light is focused by the imaging lens unit 32 to form a sharp image on the light-receiving plane of the image sensor 34. As shown in FIG. 3, the image sensor 34 is a 3-line color CCD sensor comprising a line CCD sensor 34R for reading a R image, a line CCD sensor 34G for reading a G image, and a line CCD sensor 34B for reading a B image. As already mentioned, the respective line CCD sensors extend in the main scanning direction. The projected light from the film F is separated into three primary colors R, G and B and captured photoelectrically by means of the image sensor 34.

The output signals from the image sensor 34 are amplified with Amp 36, converted to digital form in A/D converter 38 and sent to the image processing apparatus 14.

In the scanner 12, the images recorded on the film F are captured by two scans, the first being prescan at low resolution and the second being fine scan for obtaining output image data. Prescan is performed under preset reading conditions that ensure that the images on all films to be handled by the scanner 12 can be read without saturating the image sensor 34. Fine scan uses the prescanned data and is performed under reading conditions that are set for each frame such that the image sensor 34 is saturated at a slightly lower density than the minimum density of the image (frame) of interest. The output signals for prescan and fine scan are essentially the same data except for resolution and output levels.

It should be noted that the scanner 12 which is a component of the image input unit of the invention is by no means limited to a type that relies upon the slit scan technique described above but that it may be of a type that relies upon areal exposure, or a technique by which the image in one frame is scanned across at a time. In this alternative approach, an area CCD sensor may be used with a device for inserting R, G and B color filters between the light source and the film F. Image capturing with the area CCD sensor is performed with R, G and B color filters being sequentially inserted to color separate the image recorded on the film.

As already mentioned, the digital signals output from the scanner 12 are fed into the image processing apparatus 14 (which is hereinafter referred to simply as "processing apparatus 14").

Figure 5:
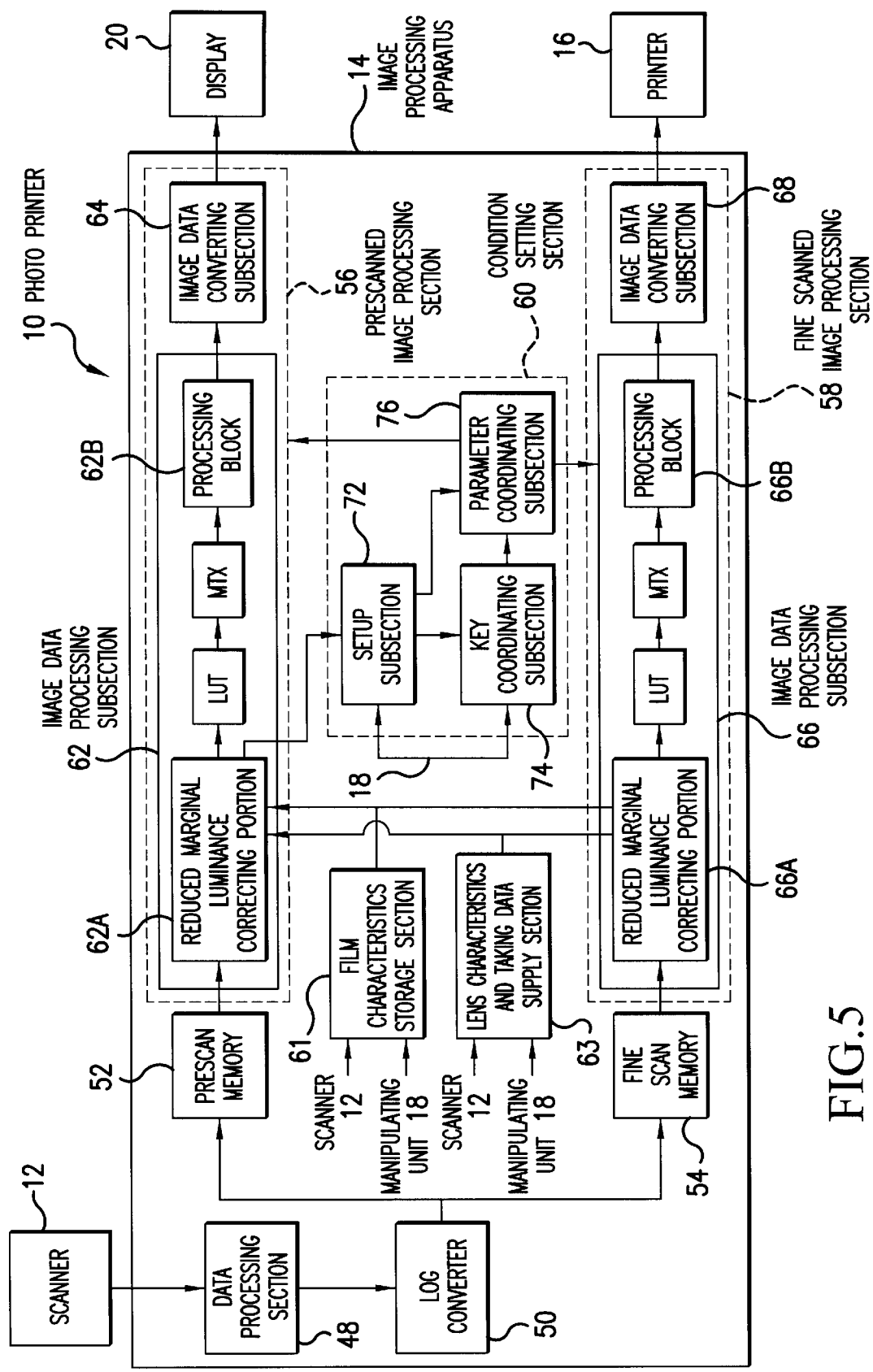
FIG. 5 is a block diagram of an exemplary image processing apparatus in the photoprinter shown in FIG. 1.

FIG. 5 is a block diagram showing the internal configuration of the processing apparatus 14, which comprises a data processing section 48, a log converter 50, a prescan (frame) memory 52, a fine scan (frame) memory 54, a prescanned image processing section 56, a fine scanned image processing section 58, a condition setting section 60, a film characteristics storage section 61, and a lens characteristics and taking data supply section 63

FIG. 5 shows only the sites related to image processing and besides these sites, the processing apparatus 14 includes a CPU for controlling and managing the overall operation of the photoprinter 10 including the processing apparatus 14, memories for storing the information necessary for the operation and otherwise of the photoprinter 10. The manipulating unit 18 and the display 20 are connected to related sites via the CPU and the like (CPU bus).

The R, G and B digital signals output from the scanner 12 are sent to the data processing section 48, where they are subjected to specified data processing steps such as dark correction, defective image correction and shading correction. Thereafter, the processed digital signals are transferred into the log converter 50, where they are converted to digital form (density data), of which prescanned data is stored in the prescan memory 52 and fine scanned data is stored in the fine scan memory 54.

The prescanned data stored in the prescan memory 52 is read into the prescanned image processing section 56 having an image data processing subsection (hereinafter referred to simply as "processing subsection") 62 and an image data converting subsection 64 whereas the fine scanned data stored in the fine scan memory 54 is read into the fine scanned image processing section 58 having an image data processing subsection (hereinafter referred to simply as "processing subsection") 66 and an image data converting subsection 68.

The processing subsection 62 in the prescanned image processing section 56 and the processing subsection 66 in the fine scanned image processing section 58 are the sites where the image (image data) captured with the scanner 12 is subjected to various image processing steps in accordance with the conditions that are set by means of the condition setting section 60 to be described later in this specification. The image processing steps to be performed in the two processing subsections 62 and 66 are the correction in accordance with at least one of the camera model and shutter type adopted for taking the image, and the shutter speed and stop-down value adopted for taking the image (taking data), the correction in accordance with the lens and film characteristics of the camera used to take the image, and other specified image processing steps.

The specified image processing steps to be performed in the two processing subsections 62 and 66 are exemplified by color balance adjustment, contrast correction (toning), brightness correction, dodging (compression/expansion of the density's dynamic range), saturation correction, and sharpness enhancement (sharpening). These steps are carried out by known methods comprising appropriate combinations of arithmetic operations, processing with LUTs (look-up tables), matrix (MTX) operations, processing with filters, and so forth. In the illustrated case, color balance adjustment, brightness correction and contrast correction are performed with LUTs and saturation correction is performed with MTXs. Other steps such as sharpness enhancement and dodging are performed in blocks 62B and 66B in response to an operator's command or in accordance with the image data, and so forth.

The LUT in the processing subsection 62 is preceded by a portion 62A for correcting reduced marginal luminosity in prescan mode, and the LUT in the processing subsection 66 is preceded by a portion 66A for correcting reduced marginal luminosity in fine scan mode.

In the processing apparatus 14 of the invention, the portions 62A and 66A are sites where, on the basis of the lens characteristics plus the position information about the image, as well as on the basis of at least one of the shutter type, the shutter speed and the stop-down value plus the position information about the image, image processing is optionally performed to correct density unevenness including the reduction of the marginal luminosity of the image recorded on the film F; as a result, prints are consistently output that reproduce high-quality images which have no density unevenness in individual frames nor darkness at the edges.

The image data converting subsection 68 in the fine scanned image processing section 58 is a site where the image data processed by the processing subsection 66 is converted with a 3D (three-dimensional) LUT or the like into image data that is subsequently supplied into the printer 16 as image data corresponding to image recording with the printer 16.

The image data converting subsection 64 in the prescanned image processing section 56 optionally thins out the image data processed by the processing subsection 62 and similarly converts the image data with a 3D-LUT or the like into image data that corresponds to the representation on the display 20 and which is subsequently displayed on the display 20.

The conditions for the processing to be done in the two image data converting subsections 64 and 68 are set in the condition setting section 60 which is described later.

The condition setting section 60 sets the conditions for the various image processing schemes to be done in the prescanned image processing section 56 and the fine scanned image processing section 58. The condition setting section 60 comprises a setup subsection 72, a key correcting subsection 74, and a parameter coordinating subsection 76. The setup subsection 72 uses the prescanned data or the like to set the reading conditions for fine scan and supplies them to the scanner 12; in addition, the setup subsection 72 constructs (or calculates) the conditions for the image processing steps to be done in the prescanned image processing section 56 and the fine scanned image processing section 58 and supplies them to the parameter coordinating subsection 76.

Specifically, the setup subsection 72 reads the prescanned data from the prescan memory 52 and uses it to perform various operations including the construction of density histograms and calculation of various image characteristic quantities such as average density, highlights (minimum or lowest density) and shadows (maximum or highest density), thereby determining the reading conditions for fine scan. In addition, typically in response to commands optionally entered by the operator, the setup subsection 72 sets the conditions for color balance adjustment, tone adjustment and various other image processing schemes to be done in the processing subsection 66 (or 62).

The key correcting subsection 74 calculates the amounts of adjustment of image processing conditions (e.g. the amount of correction of LUTs) typically in accordance with various commands entered by means of keys for adjusting the density (brightness), color, contrast, sharpness, saturation and so forth that have been set in the keyboard 18a or by the mouse 18b; the key correcting subsection 74 then supplies the calculated amounts of adjustment into the parameter coordinating subsection 76.

After receiving the amount of correction of LUTs computed by the key correcting subsection 72 and the image processing conditions that have been set by the setup subsection 72, the parameter coordinating subsection 76 sets them in the processing subsection 62 of the prescanned image processing section 56 and in the processing subsection 66 of the fine scanned image processing section 58. Further, in accordance with the amounts of adjustment calculated by the key correcting subsection 74, the parameter coordinating subsection 76 either corrects (adjusts) the image processing conditions set in various parts or makes another setting of image processing conditions.

Figure 6:
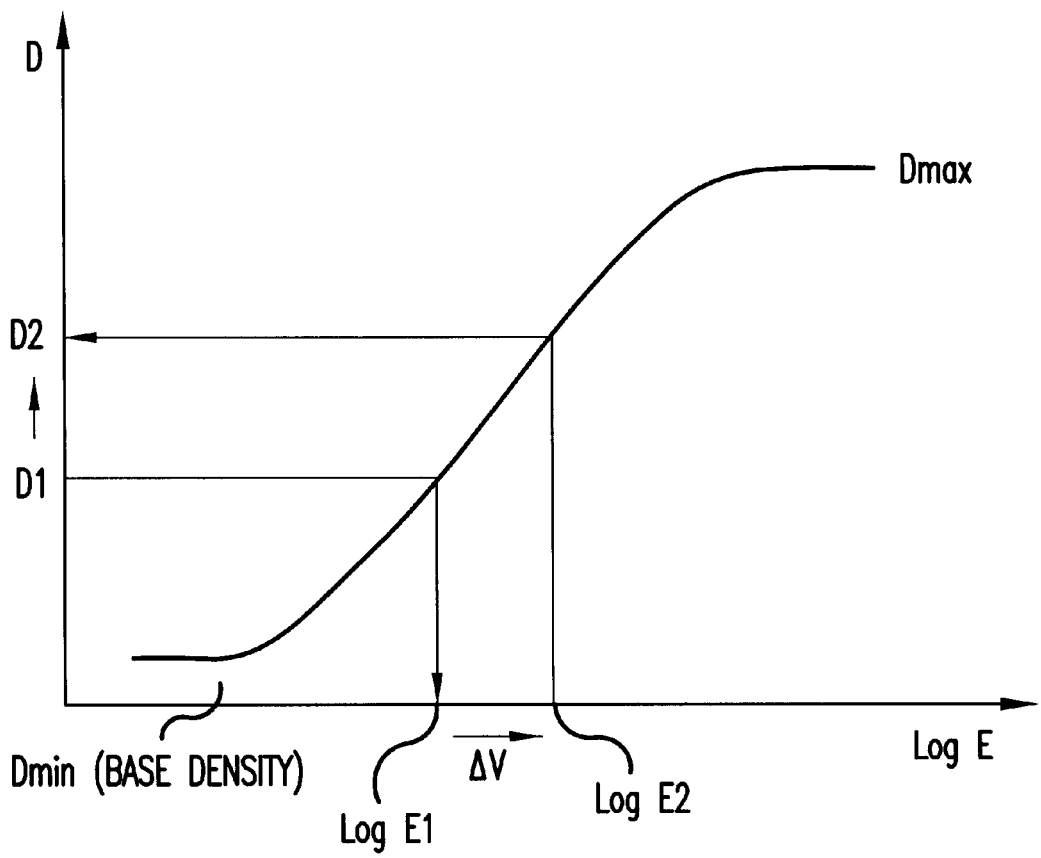
FIG. 6 is a graph showing an exemplary characteristic curve for a film and a method of correcting the reduction of the marginal luminosity.

The film characteristics storage section 61 stores the characteristics of various types of photographic films. Thus, the characteristics (gradation characteristics) of a film are represented by the relationship between the logarithm of exposure E (log E) and the density (D) as shown in FIG. 6. The graph in FIG. 6 refers to a negative film and shows only one characteristic curve. If the film F is a color film, it has three characteristic curves in association with R, G and B. Even in the case of a negative film, different film types have different characteristic curves. Even the same film has different characteristic curves for R, G and B. The characteristic curves of the reversal film are of course different from those of the negative film, but vary with the film type and the primary colors R, G and B as in the negative film.

The film characteristics storage section 61 stores the data on density D as a function of minimum density ($D_{min}$), maximum density ($D_{max}$) and a given value of log E for various types of films and such data are in the form of a database for film characteristics. The characteristic curve of a film may be stored as the following function which is by no means limiting:

$$D=D_{min(i)}+(D_{max(i)}-D_{min(i)})\times 1/(1+e^{-logE/a(i)}) \quad (i=R,G,B)$$

parameters: [R] $D_{min(R)}$, $D_{max(R)}$, a (R)

[G] $D_{min(G)}$, $D_{max(G)}$, b (G)

[B] $D_{min(B)}$, $D_{max(B)}$, c (B)

The method of detecting the film type is not limited in any particular way. In the illustrated case of an APS film F, the magnetic information recorded in the magnetic recording media S1 on the film F may be read with the magnetic heads 42 on the carrier 30 and the relevant film type is detected from the captured magnetic information and subsequently supplied to the film characteristics storage section 61.

Irrespective of whether the film F is of a conventional type (e.g. size 135) or an Advanced Photo System, the film type may be detected by reading bar codes such as DX code with the code reader 44. Alternatively, the operator may manipulate the keyboard 18a or the like to enter the film type.

In the illustrated apparatus, the characteristics of various film types are stored as a database in the film characteristics storage section 61 and retrieved therefrom in response to a detected film type. This is not the sole case of the invention and various modifications may be possible.

For example, if the film F is of an Advanced Photo System, the film characteristics may be recorded magnetically in the magnetic recording media S1, captured with the magnetic heads 42 in the scanner 42 and then supplied to the film characteristics storage section 61. If desired, irrespective of whether the film F is of a conventional type or an Advanced Photo System, the film characteristics may be optically recorded as a bar code or the like outside the image (frame) areas of the film and then captured with the image sensor 34 in the same way as the scanner 30 captures the film image or the code reader 44 reads bar codes.

The film characteristics may also be entered by the operator who manipulates the keyboard 18a or the like. In this case, the film characteristics may be recorded on the housing of a film with lens, the cartridge of the film or the like so that they are captured for data input.

Mounting an IC memory on a cartridge of an Advanced Photo System is currently under review and this idea may be utilized to identify the film type or acquire the film characteristics.

In the above-described case which is an embodiment characterized by storing a database of film characteristics in the film characteristics storage section 61 or the like, the data on film characteristics are preferably adapted for ready addition, updating, rewriting and other modifications by means of entry from the keyboard 18a or the like, reading from a recording medium such as a floppy disk, data supply from on-line services, and so forth.

In principle, these data on film characteristics are preferably supplied from film manufacturers.

The lens characteristics and taking data supply section 63 is a site where the information that identifies the camera model, taking lens and shutter type adopted for taking the film F, as well as the taking data used to take the image of each frame, for example the information about the shutter speed and stop-down value are acquired from said film F and where the lens characteristics of the taking camera associated with the obtained identifying information, as well as various kinds of information such as the shutter type associated with the taking camera, and the obtained taking data, namely shutter speed and stop-down value adopted for taking the image of each frame of the film F are gathered as much as possible; the information read out of a memory, for example a corresponding table previously constructed is supplied to the portions 62A and 66A for correcting reduced marginal luminosity.

Briefly, the lens characteristics and taking data supply section 63 (hereunder referred to simply as "data supply section") has a memory (corresponding table) which stores a previously constructed corresponding table between information about the camera model or taking lens thereof and the characteristics of the taking lens, for example a corresponding table between at least one of various kinds of information including the information about the lens characteristics in accordance with the camera model and the taking lens thereof, the information about the camera model or the shutter type thereof, and the information about the taking data used to take the image such as shutter speed and stop-down value, and uneven density characteristics (or shutter and stop-down characteristics), for example various kinds of information about the uneven density characteristics (or shutter and stop-down characteristics) associated with the camera model, its shutter type, shutter speed and stop-down value. Specifically, the memory stories previously the information about light attenuation as a function of the distance from the image center which is associated with various lens types, the information about uneven density data and light attenuation in each pixel position of the image or as a function of the distance from the image center which is associated with shutter type, and the shutter speed and stop-down value adopted for taking the image.

In the density unevenness due the taking lens characteristics, if a change in the light quantity which occurs when the light source having a uniform light quantity (light intensity) over the entire surface beams on the image on the photographic film through the above taking lens, i.e., reduction of the marginal luminosity or the light attenuation, takes, for example, a concentric configuration, this can be developed into a mathematical formula of the distance from the image center, e.g., a polynomial such as a linear expression, a quadratic expression or a cubic expression. Therefore, the memory of the data supply section 63 may be stored with the mathematical formula itself, or coefficients of respective terms and degrees of this mathematical formula as the characteristics of the taking lens. When using, e.g., the cubic expression shown hereunder as the polynomial, the coefficients a, b, c, and d may be stored for each taking lens in the memory.

$$E=ar^3+br^2+cr+d$$

where E is the amount of light attenuation, and r is the distance from the image center.

On the other hand, the change in the light quantity, i.e., the reduction of the marginal luminosity or the light attenuation, assumes an elliptical shape, and besides this configuration varies with respect to the distance from the image center. In such a case, it is impossible or difficult to express the characteristics as a mathematical formula of the distance from the image center. Even if expressed as the mathematical formula, the formula becomes intricate, with the result that the process and calculation turn out to be complicated and require a large amount of time. Hence, as the characteristics of the taking lens, e.g., a mask pattern of the entire surface of the image, or a portion thereof as the base if there is a symmetry, or, in the case of having, for instance, two symmetric axes orthogonal to each other, the mask pattern one-fourth on the entire surface of the image may be stored in the memory of the data supply section 63.

In principle, cameras of an Advanced Photo System are adapted to record the shutter speed, stop-down value and other taking data adopted for taking the image and the taking data is positively acquired. However, some cameras do not have a capability for recording such information at the time of shooting. In this case, the taking data may appropriately be entered by the operator using the manipulating unit 18 including the keyboard 18*a* and the mouse 18*b* at print time. Alternatively, a standard shutter speed may be tabulated for each camera model and used in the following manner. Instead of the information about the uneven density characteristics associated with all shutter speeds and stop-down values, namely, uneven density data and amounts of light attenuation, only the information about reference uneven density characteristics including uneven density data and light attenuation associated with the reference shutter speed is stored and, for a different shutter speed, the information about the uneven density data and light attenuation associated with said shutter speed is determined from the information about the reference uneven density data and light attenuation by a suitable technique such as arithmetic operations. This method contributes to reduce the capacity of the memory in the data supply section 63. It should be noted that the uneven density data is preferably converted to the amount of light attenuation in the taking light quantity.

Figure 10:
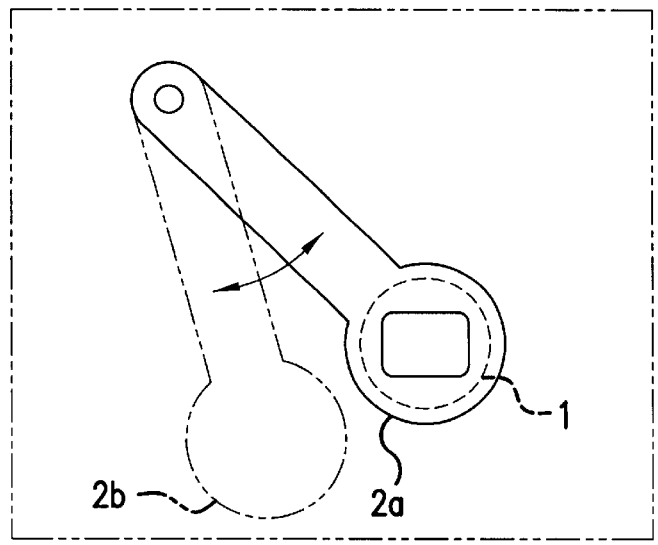
FIG. 10 shows the operating principle of a pendulum-type shutter.
Figure 11A:
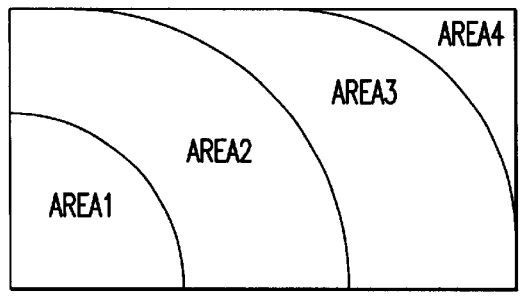
FIG. 11a shows four areas into which a film image is split.
Figure 11B:
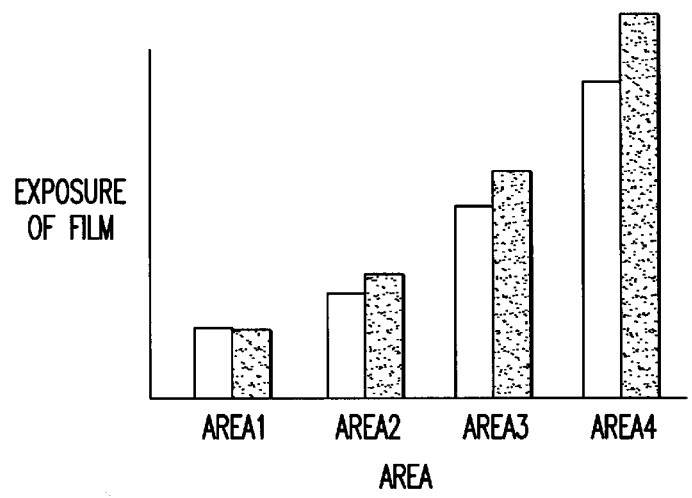
FIG. 11b shows how the amount of exposure varies from one area to another at different shutter speeds.
Figure 12:
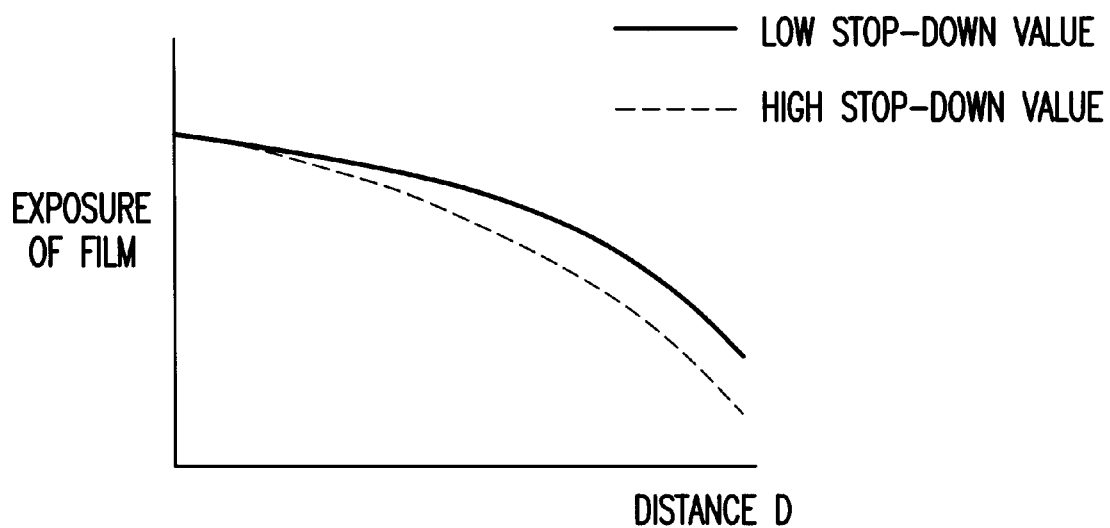
FIG. 12 shows how the amount of exposure varies on a film image at different stop-down values of a camera.

The reference uneven density characteristics including uneven density data and light attenuation can be prepared in the following manner: We now explain the reference uneven density data as the reference uneven density characteristics. First, the pattern of density unevenness is modeled for each combination to be prepared between the shutter type of the camera model used, for example pendulum-type shutter in the film with lens, lens shutter in the compact camera, or focal-plane shutter in the single-lens reflex camera, the shutter speed thereof and the stop-down value. Thus, the pendulum-type shutter in the film with lens moves like a pendulum, as shown in FIG. 10, hence has a structure in which the portion that opens first closes last. Then, modeling is performed in the film with lens so that the pendulum has a large amount of exposure in a position in which the pendulum opens first.

Then, the combination to be actually prepared is used to take an image on a film actually. The film is captured with a scanner to optimize the parameters of the uneven density pattern model on the basis of the actual uneven density data, whereby the reference uneven density data can be obtained. The reference uneven density data is desirably prepared with the taking light quantity.

The reference uneven density data as used in the present invention is preferably corrected for each of the scanner 12 used in the photoprinter 10 to which the image processing apparatus 14 of the invention is applied. In general, the scanner 12 is different for each model how the reading densities are allocated to the output signals. Thus, the scanner 12 allocates in some cases linearly with respect to the density, and in other cases linearly with respect to the luminance. Further, the color balance may often vary with the spectral sensitivity of the scanner 12. Therefore, standardization is possible, if the characteristics of the scanner 12 are corrected when performing density unevenness correction. However, high-speed processing becomes possible, if the reference uneven density data is allocated to the scanner signals in the present invention.

The reference uneven density data described above is preferably prepared prior to the use of the image processing apparatus 14 of the invention. However, it is more preferable that makers fabricating the image processing apparatus 14 of the invention, the scanner 12 and the photoprinter 10, as well as film makers fabricating the films to be processed in the image processing apparatus 14 of the invention, especially films with lens, and camera makers fabricating compact cameras and single-lens reflex cameras prepare the reference uneven density data previously to distribute to the users of the image processing apparatus 14 of the invention, the scanner 12 and the photoprinter 10, as exemplified by photographic print shops and individual laboratories, through internet, LAN and computer communication.

Based on the information for identifying the camera model, shutter type and taking lens as acquired in the data supply section 63, as well as the information about the taking data including shutter speed and stop-down value, the data supply section 63 reads associated information such as the taking lens characteristics and uneven density characteristics, for example uneven density data and reference uneven density data or the shutter and stop-down characteristics from the memory and supplies them into the portions 62A and 66A for correcting reduced marginal luminosity. It should be noted that the information about the taking lens characteristics, uneven density characteristics (or shutter and stop-down characteristics) and taking data including shutter speed and stop-down value are by no means limited to those which are stored in the memory of the data supply section 63; they may be stored as an accessible database connected to the printer 10 or, alternatively, they may be input from an external circuit as film-associated information including camera model, shutter type, shutter speed, stop-down value, shutter characteristics, stop-down characteristics and taking lens during the reading of the film F.

The portions 62A and 66A for correcting reduced marginal luminosity uses the characteristics of the lens used to take the film F, the shutter type (camera model), the shutter speed and stop-down value adopted for taking the image, uneven density characteristics based on these data (uneven density data, reference uneven density data and so forth), or the shutter and stop-down characteristics, the information about the image data (pixel) position, and the position of coordinates from the image center (how many pixels are there from the center) that were supplied from the data supply section 63 to thereby calculate amounts of light attenuation that are associated with the pixel position, preferably the position of coordinates from the image center. Thus, three types of density unevenness including reduction of the marginal luminosity due to the taking lens itself, shutter unevenness and variation in the reduction of the marginal luminosity due to the stop-down value are corrected. In the following description, these types of density unevenness and the correction thereof are referred to as "uneven marginal luminosity" and "correction of the marginal luminosity", respectively. Details of the correction of the marginal luminosity will be given later in this specification.

We now describe the image processing apparatus of the invention in greater detail by explaining the operation of the processing apparatus 14, in particular, the portion 62A (or 66A) for correcting reduced marginal luminosity.

The operator loads the scanner 12 with a carrier 30 that is associated with the film F (negative film F in the illustrated case), sets the film F (or its cartridge to be more exact) in a specified position on the carrier 30, enters the necessary information such as the size of the prints to be prepared, and thereafter keys in a command for starting print preparation.

In response to the START command, the stop-down value (aperture size) of the variable diaphragm 24 in the scanner 12 and the storage time of the image sensor (line CCD sensors) 34 are set in accordance with the reading conditions for prescan; thereafter, the carrier 30 unwinds the film F from the cartridge and transports it in the auxiliary scanning direction at a specified speed to start prescan; as already mentioned, the film F is subjected to slit scan in the specified reading position and the projected light is focused on the image sensor 34 so that the image recorded on the film F is captured photoelectrically as R, G and B separations.

During the transport of the film F, the magnetic heads 42 read the magnetic information recorded in the magnetic recording media S and the code reader 44 reads bar codes such as DX code, whereupon the necessary information is sent to a specified site. In the case under discussion, the film type and lens information, and at least one of the camera model, shutter type, shutter speed and stop-down value are detected from the magnetic information recorded in the magnetic recording media S1 and supplied to the film characteristics storage section 61 and the data supply section 63.

In the present invention, both prescan and fine scan may be performed frame by frame. Alternatively, all frames may successively be subjected to prescan and fine scan. If desired, prescan and fine scan may continuously be performed on frame groups each consisting of a given number of frames. On the pages that follow, the case of reading the image in one frame is described for the sake of simplicity.

The output signals produced from the image sensor 34 by prescan are amplified by Amp 36 and sent to the A/D converter 38, where they are converted to digital form. The digital signals are sent to the processing apparatus 14, where they are given specified data processing steps in the data processing section 48 and converted to prescanned data (digital image data) in the log converter 50, with the prescanned data being then stored in the prescan memory 52.

The portion 62A in the processing subsection 62 for correcting reduced marginal luminosity in prescan mode reads the stored prescanned data out of the prescan memory 52 and performs the necessary correction.

Figure 7:
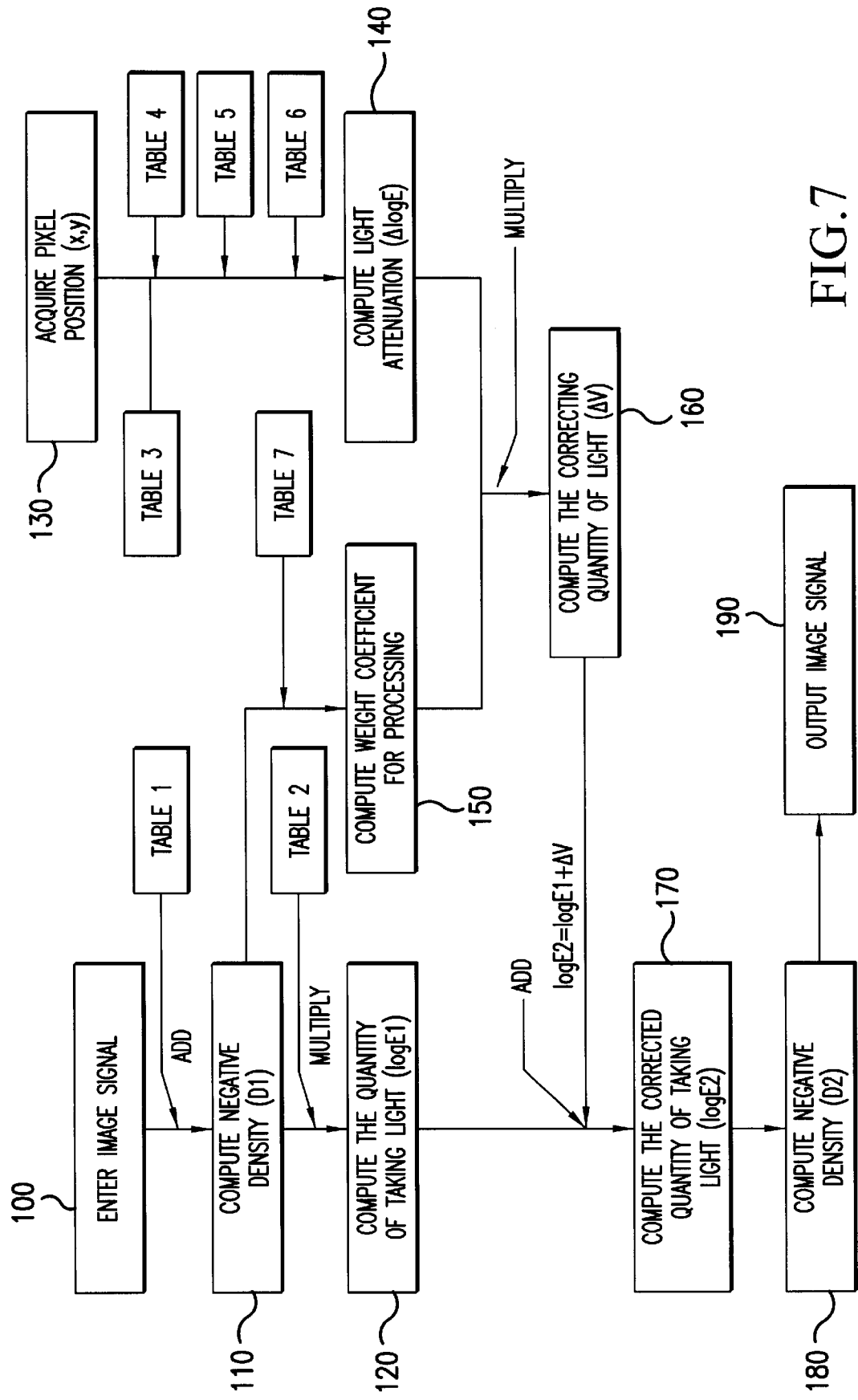
FIG. 7 is a flowchart for correcting reduced marginal luminosity in an embodiment of the invention.

We now describe the sequence of steps in correcting reduced marginal luminosity with reference to the flowchart shown in FIG. 7.

First, in step 100, the portion 62A reads the prescanned data from the prescan memory 52. In step 110, the portion 62A references table 1 (conversion table for the negative density) for each of R, G and B and computes negative density $D_1$ on the basis of that table. Next, in step 120, the portion 62A references table 2 (conversion table for the amount of taking light) and using the film characteristics shown in FIG. 6 that were supplied from the film characteristics storage section 61 (as already mentioned, three characteristic curves for R, G and B must be used if the film is a color film), it computes the amount of taking light log Ea, as shown in FIG. 6.

In separate step 130, the portion 62A acquires the position (x,y) of the pixel to be processed. In step 140, the portion 62A references table 3 (conversion table for the taking lens characteristics) and using the lens characteristics supplied from the lens characteristics and taking data supply section 63, it computes the light attenuation $\Delta$log E ($\Delta$log Eb) which represents the drop in the quantity of light at that pixel.

In a film with lens or a part of compact cameras, the shutter speed is often fixed to a given value. When shooting with such cameras, in step 140, the portion 62A references table 4 (conversion table for the fixed shutter unevenness) and using the uneven density characteristics or the shutter characteristics based on the information about the camera model and shutter type that were supplied from the data supply section 63, it computes the light attenuation $\Delta$log E ($\Delta$log Ec) which represents the density unevenness (shutter unevenness) at that pixel with respect to the position (x,y) of the pixel to be processed. In this case, the stop-down value should to set to a specified value.

A part of compact cameras, and single- and double-lens reflex cameras are capable of shooting with varying shutter speed. When shooting with such cameras, in step 140, the portion 62A references table 5 (table for the shutter unevenness characteristics) and using the uneven density characteristics or the shutter characteristics based on the information about the camera model (shutter type) and the shutter speed that were supplied from the data supply section 63, it computes the light attenuation $\Delta$log E ($\Delta$log Ec) which represents the density unevenness (shutter unevenness) at that pixel with respect to the position (x,y) of the pixel to be processed.

Further, when shooting with a camera of variable diaphragm type, in step 140, the portion 62A references table 6 (table for the uneven stop-down characteristics) and using uneven density characteristics or the stop-down characteristics based on the information about the camera model (diaphragm type) and the stop-down value that were supplied from the data supply section 63, it computes the light attenuation $\Delta$log E ($\Delta$log Ed) which represents the density unevenness (variation in the reduction of the marginal luminosity) at that pixel with respect to the position (x, y) of the pixel to be processed.

When the shutter speed or the stop-down value is variable, the reference uneven density characteristics (reference uneven density data) in the reference shutter speed or stop-down value, or the reference shutter and stop-down characteristics and the conversion formula for the reference shutter speed and stop-down value are stored in table 5, as described above. Thus, memory capacity of table 5 can be reduced by calculating the light attenuation $\Delta\log E$ ($\Delta\log Ec$ or $\Delta\log Ed$) which represents the density unevenness (uneven density data) at a given shutter speed or stop-down value.

Tables 3, 4, 5 and 6 can be stored in the memory of at least one of the data supply section 63 and the portion 62A (66A), or as an external memory.

The density unevenness (uneven marginal luminosity) to be corrected in the invention can be calculated by adding some of or at least one of the thus obtained amounts of light attenuation $\Delta\log E$ ($\Delta\log Ea$, $\Delta\log Eb$ or $\Delta\log Ec$ and $\Delta\log Ed$). The light attenuation to be added can be appropriately selected from the amounts of light attenuation $\Delta\log Ea$, $\Delta\log Eb$ or $\Delta\log Ec$ and $\Delta\log Ed$. For example, the light attenuation can be selected in accordance with the degree of the density unevenness to be corrected that will be described later. The addition of these amounts of light attenuation may be performed as required with weighting to each amount of light attenuation.

The light attenuation can be calculated at high speed, if the uneven marginal luminosity data including reduced marginal luminosity data and uneven density data, and the lens characteristics, shutter characteristics, and stop-down characteristics supplied from the data supply section 63 are previously determined as taking light quantity data, more preferably light attenuation data.

Typically, the correction to be performed on the density unevenness or the reduced luminosity associated with shutter speed and stop-down value is from about a fraction to a tenth of the correction to be performed on the density unevenness or the reduced luminosity due to lens characteristics. Therefore, as just described below, the necessary correction of density unevenness or reduced luminosity must be performed after determining the degree of correction that is to be performed on the pixel of interest.

Next, in step 150, the portion 62A references table 7 (weight table 7) and determines a weight coefficient k which is a measure of the degree by which the pixel should be corrected.

Figure 8:
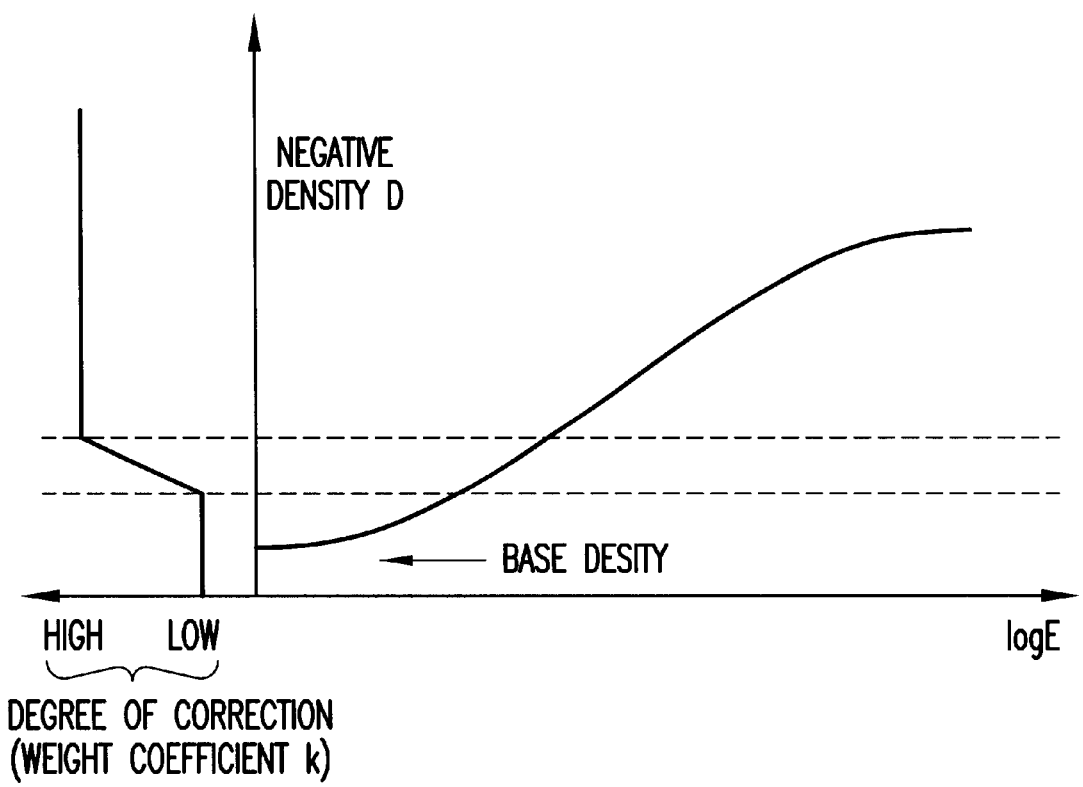
FIG. 8 is a graph showing the degree of correction of reduced marginal luminosity in the embodiment.

The three levels of correction of reduced marginal luminosity, especially due to the lens characteristics are shown in FIG. 8; the correction of reduced marginal luminosity is not implemented at all or so much by setting the weight coefficient k to "0" (or minimizing "k") or reducing the weight coefficient k (i.e., the degree of correction is "low" in FIG. 8) in the vicinity of a base density (i.e.,the minimum density) implying the darkest area on the negative film, which is defined as an unexposed area; with respect to a range existing away from the base density (the minimum density), the weight coefficient k is set to "1" (or maximized) or increased, and the correction is thus intensively or most intensively carried out (i.e., the degree of correction is "high" in FIG. 8). As for an intermediate range, it is preferable that an intermediate correction be executed. This is because it might happen that the picture becomes unnatural with an increased density in the vicinity of the base density if the intensive correction is conducted in the vicinity of the base density.

Namely, according to the present invention, it is preferable that the intensity of the marginal luminosity correction be changed corresponding to the negative density of the image. This makes it possible to decrease the correction intensity (a decrease in the weight coefficient k) in the vicinity of the base density and to increase the correction intensity as it gets farther away from the base density (an increase in the weight coefficient k), whereby it is feasible to finish the print exhibiting a naturally finished picture.

In step 160, the weight coefficient k is multiplied by light attenuation $\Delta\log E$ to compute $\Delta V$ which represents a correcting quantity of light. In step 170, $\Delta V$ is added to the quantity of taking light $\log E_1$ to determine $\log E_2$ which represents the corrected quantity of taking light. Next, in step 180, using the film characteristics shown in FIG. 6, the portion 62A reconverts $\log E_2$ to a negative density $D_2$, which is output as an image signal in step 190.

In the illustrated case, all types of density unevenness including reduced marginal luminosity due to lens characteristics, shutter unevenness and variation in the reduction of the marginal luminosity due to stop-down value are converted to the light attenuation $\Delta\log E$, and the thus obtained amounts of light attenuation are added to determine a total light attenuation $\Delta\log E$, based on which a correcting quantity of light $\Delta V$ is obtained. However, a total correcting quantity of light $\Delta V$ may be determined after correcting quantities of light $\Delta V$ obtained for individual types of density unevenness are all added. Alternatively, a corrected quantity of taking light $\log E_2$ for correcting a type of density unevenness may be first determined and referenced to sequentially determine a corrected quantity of taking light $\log E_2$ for correcting the next density unevenness.

Thus, in the embodiment under consideration, the portion 62A computes a negative density from an input image signal, converts the negative density to the quantity of taking light by making use of film's characteristic curves, performs correction within the range of obtained quantity of taking light, and reconverts the corrected quantity of light to a negative density.

It should be noted that in the generally straight portion of a characteristic curve, the light attenuation to be corrected may be converted to a negative density, which is added to the density of the actual image. This allows for performing the necessary correction in the density domain.

In the example discussed above, the image on the negative film is set as the object for the marginal luminosity correction, and the intensity of the marginal luminosity correction is changed corresponding to the negative density of the image. Then, the correction intensity is decreased in the vicinity of the base density indicating the minimum density of the unexposed area, and the correction intensity is increased as it gets farther away from the base density. The present invention is not however limited to this case. For example, the image on the reversal film is set as an object for the marginal luminosity correction, wherein the correction intensity may be decreased in the vicinity of the base density showing the maximum density of the unexposed area, and increased as it becomes farther away from the base density. Alternatively, the correction intensity may be decreased in the vicinity of a fog density showing a maximum density which is defined as a fog range in the negative film or in the vicinity of the fog density indicating a minimum density which is defined as the fog range in the reversal film, and may be increased as it gets farther way from the maximum or minimum density (fog density).

Figure 9A:
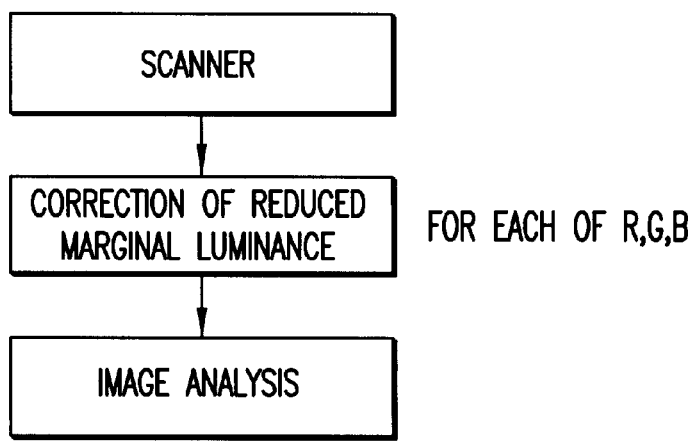
FIG. 9a shows an outline of the steps in correcting reduced marginal luminosity in the embodiment.

The data that has been corrected for reduced marginal luminosity is sent to the conditions setting section 60, which sets the conditions for the image processing schemes to be performed and carries out various image analyzing steps, as shown in FIG. 9a. In the case just considered above, reduced marginal luminosity is corrected for each of R, G and B. If desired, correction may be performed in terms of brightness only as will be described later.

Receiving the corrected data from the portion 62A, the setup subsection 72 in the conditions setting section 60 constructs density histograms, computes image characteristic quantities such as highlights and shadows and performs any other necessary operations to set the reading conditions for fine scan, which are then supplied to the scanner 12. The setup subsection 72 also sets the conditions for various other image processing schemes such as tone adjustment and gray balance adjustment and supplies them to the parameter coordinating subsection 76.

Upon receiving the image processing conditions, the parameter coordinating subsection 76 sets them at a specified site (hardware) in the prescanned image processing section 56 and the fine scanned image processing section 58.

The image corrected for the reduced marginal luminosity is thereafter processed in the LUT and MTX, from which it is sent to the block 62B and subjected to sharpness enhancement, dodging and other necessary image processing schemes. The corrected image is then converted to a suitable form in the image data converting subsection 64 and represented as a simulated image on the display 20.

Looking at the representation on the display 20, the operator checks (verifies) the image, or the result of the processing and, if necessary, manipulates the aforementioned keys on the keyboard 18a or the mouse 18b to adjust the color, density, gradation and other features of the image.

Fine scan is performed in essentially the same manner as the already described prescan except that the reading conditions are those for fine scan including the stop-down value of the variable diaphragm 24; the output signals from the image sensor 34 are amplified with Amp 36, converted to digital form in the A/D converter 38, processed by the data processing section 48 in the processing apparatus 14, converted to fine scanned data in the log converter 50 and sent to the fine scan memory 54.

The fine scanned data being sent to the fine scan memory 54 is read by means of the fine scanned image processing section 58, subjected to image processing in the processing subsection 66 in the same manner as in the above-described processing subsection 62 for prescan. Namely, the portion 66A performs the correction of the density unevenness (uneven marginal luminosity) described above and other image processing steps in the same manner as in the portion 62A. The thus processed data is subsequently converted to output image data in the image data converting subsection 68 before it is sent to the printer 16.

Figure 9B:
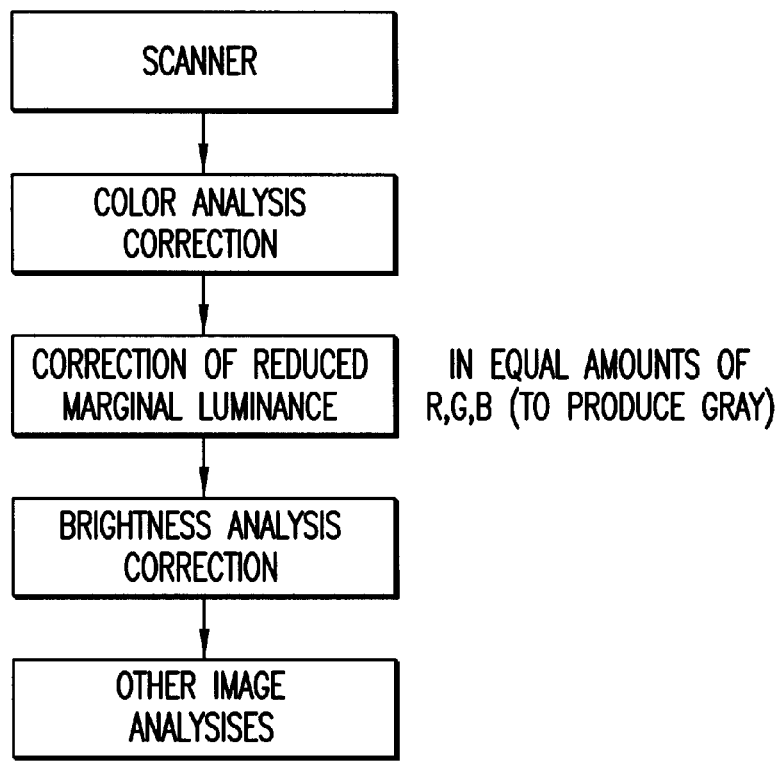
FIG. 9b shows another outline of the steps in correcting reduced marginal luminosity.

In the case described above, the reduced marginal luminosity is corrected for each of R, G and B prior to image analyzing schemes such as auto-setup (see FIG. 9a). If desired, only color balance adjustment (color analysis correction) may be performed prior to the correction of the reduced marginal luminosity (see FIG. 9b). To state more specifically, the color balance is adjusted to produce equal amounts of R, G and B and the reduced marginal luminosity is corrected in terms of the gray component; thereafter, tonal correction is performed for brightness (brightness analysis correction), followed by other image analyzing schemes such as sharpness enhancement and dodging. This alternative approach has the advantage of requiring only one characteristic curve.

While the image processing apparatus of the present invention has been described above in detail, it should be noted that the invention is by no means limited to the foregoing embodiments and various improvements and modifications may of course be made without departing from the scope and spirit of the invention.

As described above in detail, the present invention provides an image processing apparatus with which even images taken on a film with lens or using an inexpensive compact camera can be corrected not only for the reduction of the marginal luminosity associated with the lens performance itself but also for the density unevenness including the uneven marginal luminosity of the image associated with shutter type and shutter speed, and the variation in the reduction of the marginal luminosity of the image associated with stop-down value, thereby enabling consistent production of naturally finished high-quality images that are by no means dark at the edges.

What is claimed is:

1. An image processing apparatus that captures an image on a photographic film photoelectrically to produce input image data and which performs specified image processing schemes on said input image data to produce output image data, said apparatus comprising:

an uneven density characteristics acquiring device in which uneven density characteristics associated with at least one of a camera model used to take said image of said photographic film and taking data are acquired; and an image data correcting device for correcting said input image data in accordance with the thus acquired said uneven density characteristics.

2. The image processing apparatus according to claim 1, wherein said taking data include at least one of a shutter speed and a stop-down value of said camera model.

3. The image processing apparatus according to claim 1, wherein said uneven density characteristics are uneven density data of said image.

4. The image processing apparatus according to claim 1, wherein said uneven density characteristics acquiring device includes:

a first storage device for storing said uneven density characteristics for each camera model used to take said image of said photographic film, or for each combination of said camera model with said taking data thereof; and a device for acquiring information about said camera model used to take the image of said photographic film or information about said camera model and said taking data thereof, wherein said uneven density characteristics associated with said camera model or said camera model together with said taking data are read out of said first storage device, based on said information acquired about said camera model or said camera model and said taking data.

5. The image processing apparatus according to claim 4, wherein said first storage device stores reference uneven density characteristics associated with a reference shutter speed for said each camera model, and wherein said uneven density characteristics acquiring device further includes a device for calculating uneven density characteristics associated with the shutter speed from said reference uneven density characteristics when said shutter speed of said camera model is different from said reference shutter speed.

6. The image processing apparatus according to claim 5, wherein said reference uneven density characteristics are reference uneven density data that are corrected for each image reading apparatus for reading said image on said photographic film.

7. The image processing apparatus according to claim 1, wherein said image data correcting device includes:
- a first device for developing said uneven density characteristics acquired by said uneven density characteristics acquiring device into a first light attenuation amount in accordance with a position of said image, and
- a first density unevenness correcting device that subjects said input image data to a density unevenness correction of said image using said first light attenuation amount.

8. The image processing apparatus according to claim 7, wherein said first device for developing said uneven density characteristics into said first light attenuation amount calculates said first light attenuation amount in accordance with a distance from a center of said image due to said uneven density characteristics.

9. The image processing apparatus according to claim 7, wherein said first density unevenness correcting device performs said density unevenness correction in said image using a distance from a center of said image and said first light attenuation amount.

10. The image processing apparatus according to claim 1, wherein said image data correcting device changes a correction intensity of said density unevenness correction in accordance with a density of said photographic film of said image, decreases said correction intensity in a vicinity of a minimum density in said photographic film or a maximum density in said photographic film, and increases said correction intensity as it gets farther away from said minimum density or said maximum density.

11. The image processing apparatus according to claim 1, which further includes:
- a device for acquiring information about said photographic film; and
- a device for mutually converting a density of said photographic film and a taking light quantity using characteristics of said photographic film as obtained from said information about said photographic film,
- wherein said image data correcting device performs said density unevenness correction in a region having said taking light quantity.

12. The image processing apparatus according to claim 1, wherein in prescan mode for reading said image at low resolution performed prior to image reading for producing said output image data, said image data correcting device performs said density unevenness correction before image analyzing processing including an auto setup process is performed, or after only a color balance adjustment included in said image analyzing processing is performed.

13. The image processing apparatus according to claim 1, wherein said image data correcting device does not perform intensely said density unevenness correction in a vicinity of a minimum density or a maximum density about said image, intensely performs said density unevenness correction in a density region apart from said minimum density or said maximum density, and performs said density unevenness correction with an intermediate intensity in an intermediate density region.

14. The image processing apparatus according to claim 1, which further includes:
- a taking lens characteristics acquiring device for acquiring taking lens characteristics of said camera model used to take said image of said photographic film, wherein said image data correcting device further includes:
  - a second device for developing said taking lens characteristics acquired by said taking lens characteristics acquiring device into a second light attenuation amount in accordance with a position of said image; and
  - a second density unevenness correcting device that corrects density unevenness caused in a frame of said image due to reduction of marginal luminosity.

15. The image processing apparatus according to claim 14, wherein said second device for developing said taking lens characteristics into said second light attenuation amount calculates said second light attenuation amount in accordance with a distance from a center of said image due to said uneven density characteristics.

16. The image processing apparatus according to claim 14, wherein said taking lens characteristics acquiring device includes:
- a taking lens information acquiring device; and
- a second storage device for storing said taking lens characteristics for each of information about a taking lens previously prepared,
- wherein said taking lens characteristics in accordance with said information about said taking lens obtained by said taking lens information acquiring device are read out of said second storage device.

17. The image processing apparatus according to claim 16, wherein said first and second storage devices are composed of one memory, said first and second density unevenness correcting device are composed of one unit, and said first and second light attenuation amounts are added and used to subject said input image data to said density unevenness correction in said image.

* * * * *